United States Patent
Thompson et al.

(10) Patent No.: US 11,262,828 B2
(45) Date of Patent: Mar. 1, 2022

(54) SYSTEMS AND METHODS FOR COMMUNICATING POWER STATE INFORMATION FROM AN EXTERNAL ENERGY STORAGE DEVICE (EESD) TO AN INFORMATION HANDLING SYSTEM

(71) Applicant: DELL PRODUCTS L.P., Round Rock, TX (US)

(72) Inventors: Richard C. Thompson, Cedar Park, TX (US); Karthikeyan Krishnakumar, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 295 days.

(21) Appl. No.: 15/963,796

(22) Filed: Apr. 26, 2018

(65) Prior Publication Data
US 2019/0332154 A1    Oct. 31, 2019

(51) Int. Cl.
*G06F 1/30* (2006.01)
*G06F 1/26* (2006.01)
(Continued)

(52) U.S. Cl.
CPC .............. *G06F 1/30* (2013.01); *G06F 1/263* (2013.01); *G06F 1/28* (2013.01); *G06F 1/3246* (2013.01);
(Continued)

(58) Field of Classification Search
CPC ... G06F 1/30; G06F 1/263; G06F 1/28; G06F 1/3246; G06F 13/4282
See application file for complete search history.

(56) References Cited

U.S. PATENT DOCUMENTS 6,288,893 B1 * 9/2001 Faranda .................. G06F 1/181
312/223.2
7,392,410 B2  6/2008 Allen et al.
(Continued)

OTHER PUBLICATIONS

"Power Companion Status", U.S. Appl. No. 15/494,320, filed Apr. 21, 2017, 24 pgs.
(Continued)

*Primary Examiner* — Jaweed A Abbaszadeh
*Assistant Examiner* — Gayathri Sampath
(74) *Attorney, Agent, or Firm* — Egan, Enders & Huston LLP.

(57) ABSTRACT

Systems and methods employ an external energy storage device (e.g., intelligent battery pack) interposed between a an information handling system (IHS) and its AC-to-DC adapter. The information handling system may be a fixed compute system, may lack an internal battery and/or may execute an operating system that does not have power management capability. The external energy storage device provides power and power state information to the IHS, e.g., that is based on state of charge (SOC) of the battery and/or absence/presence of AC power. IHS may perform one or more actions based on the power state information such as automatically save data and shutdown when notified AC power is lost and/or SOC is low, and may automatically restart and restore saved data when notified AC power is restored and/or SOC is sufficiently high. The external energy storage device may actively signal or command the IHS to act or may passively supply power state information and let the IHS decide how to act. The information may be provided as different power supply identifier (PSID) values or other types of analog values corresponding to different current levels on a single conductor of a single cable between the external energy storage device and IHS, or may be included in USB vendor-defined messages sent on the single cable.

25 Claims, 9 Drawing Sheets

(51) Int. Cl.
  *G06F 1/3246* (2019.01)
  *G06F 13/42* (2006.01)
  *G06F 1/28* (2006.01)
  *G06F 1/3212* (2019.01)
  *G06F 1/24* (2006.01)
  *G06F 1/16* (2006.01)

(52) U.S. Cl.
  CPC .. *G06F 13/4282* (2013.01); *G06F 2213/0042* (2013.01)

(56) References Cited

U.S. PATENT DOCUMENTS

| | | | |
|---|---|---|---|
| 8,645,720 | B2 | 2/2014 | Weng et al. |
| 8,674,823 | B1* | 3/2014 | Contario .................. H02J 1/10 |
| | | | 340/333 |
| 9,436,255 | B2 | 9/2016 | Verdum |
| 2008/0137386 | A1* | 6/2008 | Jitaru .................. H01R 31/065 |
| | | | 363/146 |
| 2009/0164820 | A1* | 6/2009 | Abraham .............. G06F 1/3203 |
| | | | 713/323 |
| 2011/0074360 | A1* | 3/2011 | Kerr ...................... H02J 7/0068 |
| | | | 320/137 |
| 2011/0084799 | A1* | 4/2011 | Ficko ........................ G07C 9/27 |
| | | | 340/5.65 |
| 2011/0179291 | A1* | 7/2011 | Weng ........................ G06F 1/26 |
| | | | 713/300 |
| 2013/0232349 | A1* | 9/2013 | Oler ........................ G06F 1/263 |
| | | | 713/300 |
| 2013/0326237 | A1* | 12/2013 | Holdengreber ......... H02J 9/061 |
| | | | 713/300 |

OTHER PUBLICATIONS

USB-C, Wikipedia, Printed From Internet Apr. 23, 2018, 9 pgs.
Montero et al., "Systems And Methods For Selective Disablement Of Protocols On A USB Type-C Port", U.S. Appl. No. 15/666,155, filed Aug. 1, 2017, 37 pgs.
Dell, "Dell Power Companion PW7015M/PW7015L, User's Guide", 2014, 17 pgs.

* cited by examiner

FIG. 2

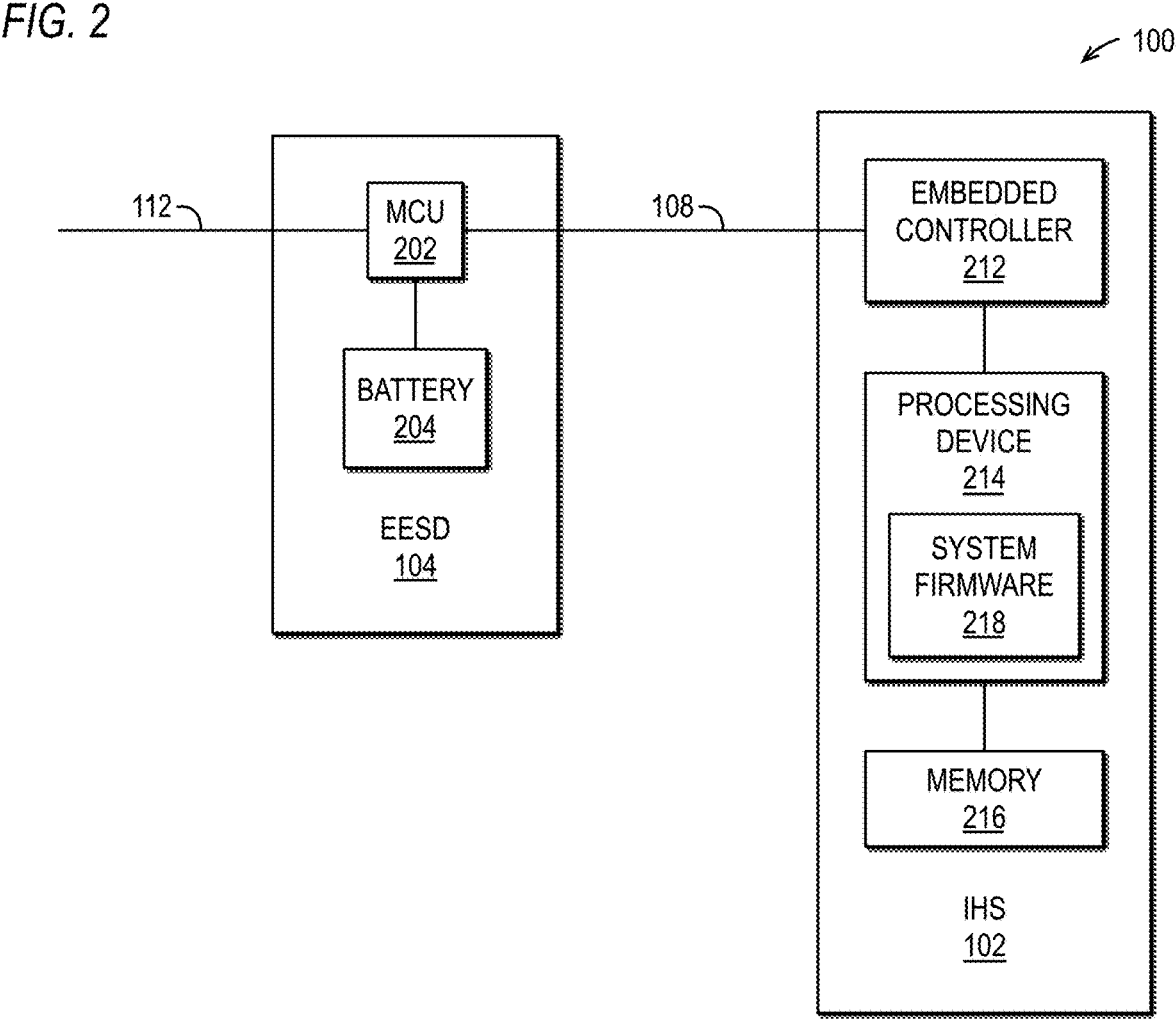

FIG. 3

| PSID 1 | AC PRESENT (PASS THROUGH PSID OF POWER ADAPTER) |
|---|---|
| PSID 2 | AC NOT PRESENT. EXTERNAL ENERGY STORAGE DEVICE OPERATING AS UPS. |
| PSID 3 | INITIATE AUTOMATIC SHUTDOWN OF INFORMATION HANDLING SYSTEM |
| PSID 4 | AC PRESENT AND EXTERNAL STORAGE ELEMENT SOC ABOVE SAFE LIMIT FOR AUTOMATIC SYSTEM RESTART AND, IF NECESSARY, SAFE AUTOMATIC SHUTDOWN. |
| PSID 5 | AC PRESENT, BUT EXTERNAL STORAGE ELEMENT SOC BELOW SAFE LIMIT FOR AUTOMATIC SHUTDOWN. ALLOW USER TO MANUALLY RESTART SYSTEM (AT RISK OF DATA LOSS) |

SYSTEMS AND METHODS FOR COMMUNICATING POWER STATE INFORMATION FROM AN EXTERNAL ENERGY STORAGE DEVICE (EESD) TO AN INFORMATION HANDLING SYSTEM

FIELD

This invention relates generally to information handling systems and, more particularly, to power management in information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known that uninterruptible power supply (UPS) systems used for personal computers (PCs) are connected over alternating current (AC) power. Loss of AC power triggers the UPS to notify the user through audible bleeps that AC power has been lost to the UPS. Some UPS come with software that can be installed on the PC and set up to initiate auto shutdown after saving data when notified by the UPS. A separate dedicated data connection (universal serial bus (USB) or serial cable) is required between the UPS and PC to enable the UPS to notify the PC of the power loss.

SUMMARY

Embodiments are described herein in which power state of an external energy storage device (EESD) (e.g., battery pack such as Dell Power Companion™ or other type external power bank) may be communicated in real time to an information handling system (e.g., fixed compute platform) to which the EESD is coupled to supply DC power. In one embodiment, an EESD may be configured to operate as an uninterruptible power supply (UPS) in conjunction with a DC-powered information handling system platform and its respective AC-to-DC power adapter. In such an embodiment, the EESD power state may communicated to an information handling system platform across a single power connection between the EESD and the information handling system platform, e.g., such as single wire barrel connector connection, Universal Serial Bus (USB) Type C connection, etc. Examples of information handling system platforms that may be employed in the disclosed systems and methods include, but are not limited to, mini-desktops, All-in-One (AIO) systems, and other information handling system platforms which do not include either an internal battery or an internal power supply that receives and converts AC power to DC power, but rather which receive DC power from an external AC to DC power adapter.

In one exemplary embodiment, EESD devices that are typically used to provide additional battery life for mobile information handling systems such as laptops may be repurposed to operate as an uninterruptible power supply (UPS) in conjunction with—fixed compute platforms and their respective external AC-to-DC power adapters. In any case, an EESD may in one embodiment be an energy storage device containing battery cells, and that receives DC output from the power adapter and provides DC power to the platform both when AC mains wall power is present to power the power adapter and when the AC wall mains wall power is not present to power the power adapter. In one embodiment, the fixed compute information handling system may have no internal energy storage (e.g., may have no battery) and is may be powered by DC power from the AC to DC adapter when the AC wall power is present and may be powered by DC power from the internal battery cells of the EESD when the AC wall power is absent.

In one embodiment, the power architecture of the operating system running on an information handling system of the disclosed systems and methods does not comprehend presence or operation of energy storage devices (e.g., internal or external battery cells) as a power source, e.g., the operating system includes no power management profiles. In this regard, a fixed compute platform is in contrast to a mobile compute device designed to operate on DC power from an energy storage device (e.g., battery cells) and having power management features (e.g., power management profiles) built into the operating system.

In one exemplary embodiment, multiple values (e.g., analog current levels, which may be power supply identifiers (PSID) or other single wire analog communication values), are stored on the EESD, each of which corresponds to a different power state. When the power state on the EESD changes, e.g., AC present to AC not present, the EESD changes the PSID appropriately to communicate to the coupled information handling system (or other information handling system that does not include internal battery or power management profiles) the change in power state. The information handling system may then use the information to take one or more actions, such as to notify the user that there has been power loss. In the event of a power loss, the information handling system may also or alternatively wait for a certain amount of time, based on the internal state of charge (SOC) of the EESD battery and whether or not AC power returns, to initiate saving user data and then shutting down the system safely. Once AC power returns, the information handling system may allow the user to manually start the information handling system or may allow for charging the EESD battery above safe limits and automatically restarting and restoring the information handling system to the same state it was in before the automatic shutdown.

In another exemplary embodiment, a USB-C interface may be employed to enable the EESD to both supply power to the information handling system and to communicate power state information using vendor-defined messaging (VDM) packets between the EESD and the information handling system.

In yet another exemplary embodiment, an information handling system may lower its P-state (executing power saving state) when it detects, from the EESD, a loss of power in order to maximize the length of time the information handling system may continue to run on the power supplied by the EESD.

In yet another exemplary embodiment, a PSID or VDM value may be changed by an EESD to provide information to the information handling system that a change of AC power state has occurred. The PSID change received by the information handling system may initiate the saving of data and smart shutdown by the system. Still further, a subsequent change in PSID may trigger a restart and restore of the saved system data to put the information handling system in a state it was in before the shutdown was initiated, such as if AC power returns and the SOC of the EESD is at a safe level.

In one respect, disclosed herein is an information handling system, including: a memory configured to store an operating system; a processing device configured to execute the operating system. The information handling system may be configured to receive, over one or more conductors of a cable, direct current (DC) power from an energy storage element of an external energy storage device that is coupled between an AC to DC power adapter and the information handling system. The information handling system may be further configured to receive, over one or more conductors of the cable, power state information including information based on a state of charge (SOC) of the energy storage element of the external energy storage device and/or the presence/absence of AC wall outlet power provided to the AC to DC power adapter. In one embodiment the information handling system may at least one of: be configured without an internal energy storage element to provide power to the memory and processing device to execute the operating system; or be configured to receive DC power from the external energy storage device on at least a first conductor of the cable and to receive the power state information on at least a second conductor of the cable. The information handling system may also be configured to perform one or more actions in response to the received power state information.

In another respect, disclosed herein is a method, comprising: receiving, by an information handling system, over one or more conductors of a cable, direct current (DC) power from an energy storage element of an external energy storage device that is coupled between an AC to DC power adapter and the information handling system; receiving, by the information handling system, over one or more conductors of the cable, power state information comprising information based on a state of charge (SOC) of the energy storage element of the external energy storage device and/or the presence/absence of AC wall outlet power provided to the AC to DC power adapter; and performing, by the information handling system, one or more actions in response to the received power state information; where at least one of: the information handling system is configured without an internal energy storage element to provide power to a memory and a processing device of the information handling system to execute an operating system; or the information handling system is configured to receive DC power from the external energy storage device on at least a first conductor of the cable and to receive the power state information on at least a second conductor of the cable.

In another respect, disclosed herein is an apparatus, including: an energy storage element having a state of charge (SOC); an input to receive power from an AC-to-DC power adapter for charging the energy storage element and for providing power to an information handling system on a cable coupling the apparatus and the information handling system; a controller configured to provide power state information to the information handling system over the cable; and where the power state information is based on the SOC of the energy storage element and/or a presence/absence of AC power to the power adapter; where the power state information includes at least one of: a command signal to cause the information handling system to perform one or more actions, or analog current values corresponding to distinct values of the power state information.

BRIEF DESCRIPTION OF THE DRAWINGS

FIG. 2 illustrates a block diagram illustrating in more detail elements of system of FIG. 1 according to one exemplary embodiment of the disclosed systems and methods.

FIG. 3 illustrates a table illustrating various PSID values and associated power states and/or actions according to one exemplary embodiment of the disclosed systems and methods.

DESCRIPTION OF ILLUSTRATIVE EMBODIMENTS

Figure 1:
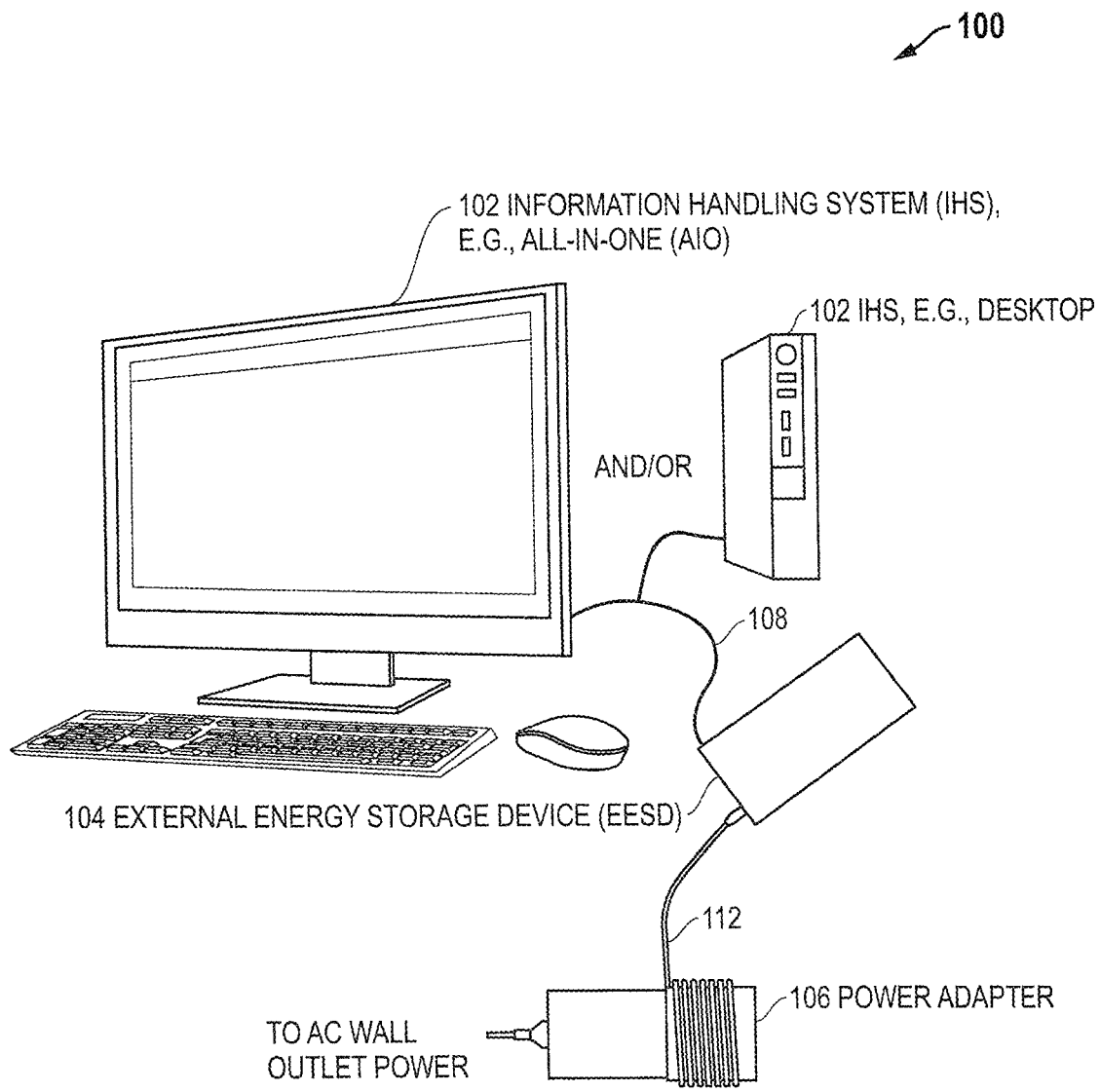
FIG. 1 illustrates a block diagram of a system according to one exemplary embodiment of the disclosed systems and methods.

FIG. 1 is a block diagram of a system 100 as it may be configured according to one embodiment of the disclosed systems and methods. The system 100 includes an information handling system 102, an external energy storage device 104, and a power adapter 106. The information handling system 102 may be, but is not limited to, a fixed computer platform (e.g., such as a desktop computer (as shown), laptop (not shown), an All-in-One (AIO) system (shown), etc.) and/or other type of information handling system having no internal power source (e.g., battery cells) and no operating system power management. The information handling system 102 receives power from the external energy storage device 104 that includes an energy storage element (e.g., energy storage element 204 of FIG. 2 or FIG. 5, e.g., battery pack). The external energy storage device 104 receives power from the power adapter 106 to charge the energy storage element. The power adapter 106 may receive power from an alternating current (AC) mains source, e.g., a wall outlet. The power adapter 106 converts the AC power to direct current (DC) power which it provides to the external energy storage device 104 to charge the energy storage element 204. Preferably, when the power adapter 106 is converting AC power to DC power being provided external device to the external energy storage device 104, the external energy storage device 104 passes on the DC power to the information handling system 102 rather than providing DC power from the energy storage element 204 and, if necessary, charges the energy storage element 204 using the DC power received from the power adapter 106. The information handling system 102 is coupled to the external energy storage device 104 by a single cable 108 that provides both the power to the information handling system 102 and power state information that is based on the state of charge (SOC) of the energy storage element 204 (e.g., percentage of full, energy amount currently stored (e.g., in Joules), etc.) of the external energy storage device 104 and/or based on the presence/absence of power from the power adapter 106 to charge the energy storage element 204. In one embodiment, the external energy storage device 104 is coupled to the power adapter 106 by a single cable 112 that is similar in conductor construction as the cable 108 and that provides both the power to the external energy storage device 104 and a PSID, as described in more detail below. In one embodiment, a single external energy storage device 104 may provide power to multiple information handling systems 102.

In one embodiment, the information handling system 102 is fixed in location, referred to herein as a fixed compute system, e.g., desktop or AIO. That is, a fixed compute system is, during operation, always connected to and powered by an AC to DC adapter connected to AC mains (e.g., wall outlet) because it has no internal energy storage (e.g., battery) to provide power to primary components of the fixed compute system that execute the operating system, e.g., CPU (e.g., microprocessor), memory (e.g., system RAM), storage (e.g., SSD or hard drive). It should be understood that a fixed compute system may include a small battery, such as a battery (e.g., CR2032 lithium coin battery) traditionally referred to as a "CMOS battery" that provides power to a "CMOS RAM" to retain BIOS settings when the system is powered down; however, such a battery is not capable of powering the primary components of the fixed compute system that execute the operating system. Furthermore, generally speaking, the power architecture of the operating system for a fixed compute system does not comprehend an internal energy storage device as a power source, e.g., the operating system includes no power management profiles for battery power management. To clarify by contrast, systems designed to operate from internal energy storage devices, e.g., batteries, are generally referred to as mobile compute devices. Mobile compute devices have power management built into the operating system. To further clarify by way of examples, fixed compute devices may include, but are not limited to, the following products from Dell Technologies of Round Rock, Tex.: OptiPlex Micro DT 3/5/7 series, OptiPlex ZFPC, Inspiron Magneto/ Mystique 21"/24" AIO (All-in-One), Inspiron Ultron/Thanos 24"/27" AIO, and Vostro platforms based on the above.

In one embodiment, the single cable 108 comprises three conductors. A first conductor provides the power from the external energy storage device 104 to the information handling system 102. A second conductor provides the power state information. A third conductor is a ground wire. In one embodiment, distinct analog current values on the single second conductor correspond to distinct values of the power state information. In one embodiment, the distinct analog current values on the single second conductor may be distinct PSID values. In other embodiments, the single second conductor may be used to perform other types of single wire analog command control structure/communication implementations to provide the power state information to an information handing system, e.g., using universal asynchronous receiver transmitter (UART), in which the MCU 202 and embedded controller 212 are configured accordingly, etc. In one embodiment, distinct PSID current levels may also be used to identify a set of distinct power adapter characteristics/capabilities, e.g., power type, wattage/voltage/current rating, peripheral manufacturer, part number, country of origin, etc., as described with respect to FIG. 5 of U.S. Pat. No. 8,645,720. An example of such a cable 108, as well as PSID levels and communication methods, are described in detail in U.S. Pat. Nos. 7,392,410; 8,645,720; and 9,436,255, each of which is hereby incorporated by reference in its entirety for all purposes. In one embodiment, the cable 108 comprises a barrel cable having three conductors in which the center conductor provides the PSID, and the information handling system 102 includes a barrel connector/plug/port for receiving the barrel cable 108, and the cable 112 comprises a similar barrel cable and the external energy storage device 104 has a similar barrel connector/plug/port for receiving the barrel cable 112. In an alternate embodiment, the single cable 108 comprises a USB cable (e.g., USB-C cable), and the power state information is provided by the external energy storage device 104 to the information handling system 102 in USB messages (e.g., vendor-defined messages (VDM)).

Examples of the external energy storage device 104 may be any of various products branded as a "Power Companion™" sold by Dell Technologies of Round Rock, Tex., conventionally used as an additional battery supply for laptop computers (having an internal battery) that may be coupled between the laptop and its power adapter to provide additional battery life. Advantageously, according to the disclosed systems and methods the external energy storage device 104 may effectively operate to both supply power to the information handling system 102 when wall power (e.g., AC mains) is not present and to notify the information handling system 102 of power state events so that the information handling system 102 may, for example, perform a graceful shutdown in response to a loss of AC main power or a restart after AC power is restored, as described in more detail below. Advantageously, the external energy storage device 104 does so via a single cable 108 coupled to the information handling system 102. Further, the external energy storage device 104 does not have its own AC power source and provides DC power, rather than AC power, to the information handling system 102.

FIG. 2 is a block diagram illustrating in more detail elements of system 100 of FIG. 1 as it may be configured according to one embodiment of the disclosed systems and methods. The information handling system 102 includes an embedded controller 212 and a memory 216, e.g., for storing an operating system and application programs. The information handling system 102 also includes a processing device 214, e.g., for executing the operating system and application programs and system firmware 218, e.g., basic input/output system (BIOS) or Unified Extensible Firmware Interface (UEFI). The external energy storage device 104 includes a microcontroller unit (MCU) 202 and an energy storage element 204. The MCU 202 and embedded controller 212 are in communication via the cable 108 of FIG. 1. The external energy storage device 104 receives power, via the cable 112 of FIG. 1, for charging the energy storage element 204 and for providing on the cable 108 to the information handling system 102. In one embodiment, the energy storage element 204 may be one or more batteries; however, other embodiments are contemplated in which the external energy storage device 104 comprises other forms of an energy storage element, e.g., a super capacitor, for providing power to the information handling system 102.

In one embodiment, the MCU 202 of FIG. 2 may, among other things, operate as a battery management unit (BMU) to manage the battery 204, e.g., to perform one or more tasks such as to monitor the battery 204 SOC and current, control charging & discharging FETs for charging and discharging the battery 204, prevent over or undercharging the battery 204, send battery 204 data to the embedded controller 212, etc. As described herein, in one embodiment the MCU 202 may be configured to operate in an active manner by analyzing the battery 204 SOC, current power usage, historical power usage data, and/or AC wall outlet power presence/absence, etc. and deciding when to provide a command signal (e.g., as PSID values or VDM data) to the information handling system (e.g., EC 212) to cause the information handling system 102 to take a power management action (e.g., automatic save data and shutdown, restart and restore data, notify user of AC power loss, notify user that SOC is below safe level to restart, etc.). In an alternative embodiment, the MCU 202 may be configured to operate in a passive manner by simply providing the SOC and/or AC presence/absence information (e.g., as PSID values or VDM data) to the information handling system 102 which then uses this provided information from MCU 202 to make decisions to take the power management actions. Thus, the logic behind what information (e.g., PSID or VDM) is communicated between EESD 194 and information handling system 102 and the logic behind deciding what power management action (and when to take it) based on the information communicated between EESD 194 and system 102 may reside and execute either on the MCU 202 (e.g., BMU) of the EESD 104 or may alternatively reside and execute on the information handling system side (e.g., in embedded controller 212, processing device 214 or other alternative processing device/s of system 102).

Multiple PSID may be stored in the external energy storage device 104, e.g., on MCU 202, based on the presence/absence of AC power on cable 112 from the power adapter 106 and/or based on the SOC of the energy storage element 204. The MCU 202 may communicate different PSID to the embedded controller 212 over the cable 108. In response, the embedded controller 212 may communicate to the system firmware 218. The system firmware 218 may include a lookup table of PSID and corresponding actions. The system firmware 218 may look up the received PSID in the table and perform the corresponding action. The actions may include, for example, performing a graceful/safe/automatic shutdown by saving system data to non-volatile memory (e.g., hard drive, SSD, NVRAM, etc.) and shutting down the information handling system 102 in response to a loss of AC power to the power adapter 106, notifying a user that AC power has been lost, or restarting the information handling system 102 and restoring the saved system data to place the information handling system 102 back to the state it had before the graceful shutdown. In one embodiment, the power adapter 106 may also provide its PSID (e.g., a distinct PSID current level that identifies its power adapter characteristics/capabilities, e.g., as described with respect to FIG. 5 of U.S. Pat. No. 8,645,720). In the embodiments of FIGS. 1 and 2, this power adapter-provided PSID data may be provided via cable 112 to the external energy storage device 104, and the external energy storage device 104 may pass the AC-DC power adapter-provided PSID on through on cable 108 to the information handling system 102. In such a case, the PSID values corresponding to power state that are stored and/or generated within the external energy storage device 104 may be separate and different current values than the conventional PSID values provided by the AC-DC power adapter 106.

Embedded controller 212 may be a super I/O controller capable of performing a plurality of input/output functions, for example, or any other controller capable of receiving the power state information from the external energy storage device 104 and communicating it to the system firmware 218.

FIG. 3 is a table illustrating various PSID values and associated power states and/or actions according to one embodiment of the disclosed systems and methods. It should be understood that the various PSID values shown in FIG. 3 may be unit-less values that are shown for illustration purposes and may not be values of currents or other electrical quantities, although the different unit-less values may correspond to distinct current values provided on the cable 108.

PSID 1 indicates that AC power is present and enabling the power adapter 106 to provide power to the external energy storage device 104 via cable 112 for charging the energy storage element 204, which may be understood as normal operating conditions. PSID 2 indicates that AC power is not present. That is, the energy storage element 204 is providing power to the information handling system 102 (i.e., the external energy storage device 104 may be operating as a UPS for the information handling system 102) and the power adapter 106 is not providing power to charge the energy storage element 204. In response to receiving PSID 2 from the external energy storage device 104, the information handling system 102 may, for example, notify a user of the information handling system 102 that AC power has been lost, e.g., via a message on the system display. In one embodiment, the information handling system 102 may start a timer that the information handling system 102 clears if AC power returns (e.g., PSID 4), and if the timer expires before being cleared, then the information handling system 102 begins a graceful shutdown procedure. In one embodiment, unitless PSID values 2 through 5, for example, correspond to PSID current levels that are distinct from the set of current level values that identify power adapter characteristics/capabilities (e.g., as described with respect to FIG. 5 of U.S. Pat. No. 8,645,720) corresponding to unitless PSID value 1.

PSID 3 indicates a state in which the information handling system 102 should initiate its graceful shutdown procedure, i.e., save its data to non-volatile memory and shut down. This is because the SOC of the energy storage element 204 has fallen below a particular level. The level is related to the amount of energy required for the information handling system 102 to perform its graceful shutdown. For example, the level may be twice the graceful shutdown amount of energy required in order to significantly increase the likelihood of the success of the graceful shutdown. In one embodiment, the external energy storage device 104 estimates the amount of energy needed to perform a graceful shutdown after AC power is lost based on current power usage (e.g., energy rate consumed for a time period such as for the next ten seconds), and assumes a similar energy consumption rate will be required for the graceful shutdown (or assumes an energy consumption rate that has been optionally increased by a factor such as 1.1 or 1.25 or other selected factor for safety). In this embodiment the external energy storage device 104 also assumes a conservative estimate for the amount of time needed for a graceful shutdown and determines the estimated amount of energy needed for shut down as equal to the energy consumed at the assumed energy consumption rate for the estimated shut down time. In one embodiment, the external energy storage device 104 maintains historical data of the information handling system 102 power usage (e.g., such as actual amount of energy previously required for system shut down and/or actual energy consumption and time required for system shut down), and rather than using the current power usage described above, the external energy storage device 104 uses the historical data to estimate the amount of energy needed for the graceful shutdown (e.g., such as estimating it will be the same as actual previous energy required for shutdown, or calculating it using the actual previous energy consumption rate and/or actual previous shut down time). In one embodiment, the information handling system 102 may communicate previously (e.g., during normal operation) to the external energy storage device 104 information needed to make the PSID 3 determination, e.g., the information handling system 102 may communicate an estimate of the amount of energy required to perform the graceful shutdown. In one embodiment, the external energy storage device 104 has programmed into it a predetermined level based on a value determined by analyzing the amount of graceful shutdown energy needed by various systems of the type that may employ the external energy storage device 104 as a UPS type device. For example, the level may be set to twice the amount of energy that is a predetermined number of standard deviations from the mean amount of energy requirement observed from a relatively large sample size of graceful shutdowns of representative systems.

PSID 4 indicates AC power has returned and that the SOC of the energy storage element 204 is above a safe level for the information handling system 102 to restart (i.e., restore the saved data and commence running from the restored state) and, if necessary (e.g., if AC power is lost again), perform a graceful shutdown. In one embodiment, even when the information handling system 102 is shut down (i.e., powered down), the embedded controller 212 continues to receive power from the external energy storage device 104 (assuming the external energy storage device 104 has power to supply, e.g., when AC power returns and/or the energy storage element 204 has charge left). Therefore, the embedded controller 212 may detect a PSID 4 from the external energy storage device 104 and automatically restart the information handling system 102.

PSID 5 indicates AC power has returned, but that the SOC of the energy storage element 204 is below a safe limit for a graceful shutdown. This may be the state, for example, if the energy storage element 204 was almost fully drained before AC power returned. In one embodiment, the information handling system 102 includes a power switch/button that a user may press to indicate to power up the system 102, and the power switch provides a signal to the embedded controller 212 to indicate when the switch is pressed. In the case of receiving a PSID 5, the embedded controller 212 may not automatically restart the information handling system 102; however, the embedded controller 212 may allow a user to manually restart the information handling system 102 via the power switch/button, i.e., to allow the user to assume the risk of data loss.

Figure 4A:
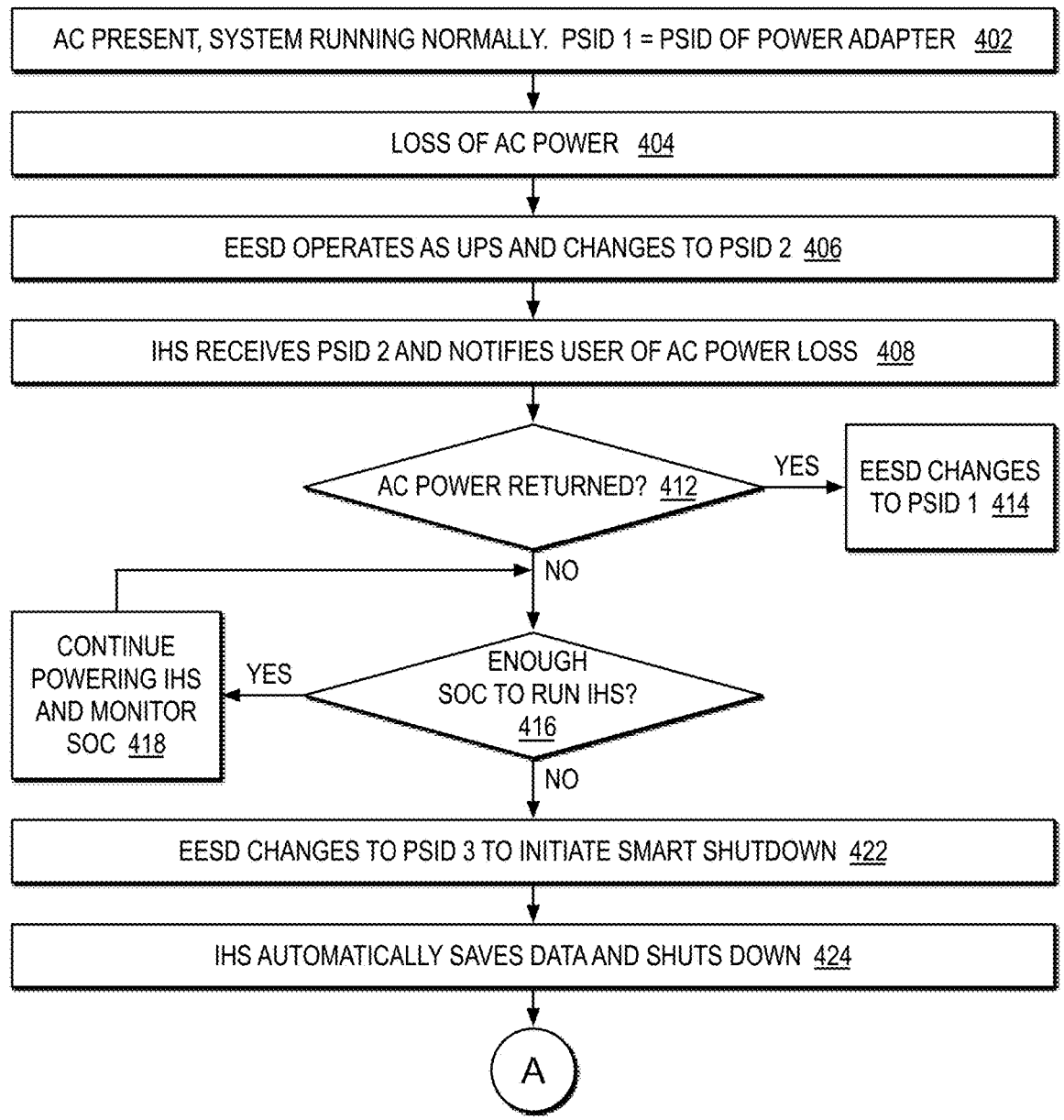
FIGS. 4A and 4B illustrate a flowchart illustrating operation of the system of FIG. 1 according to one exemplary embodiment of the disclosed systems and methods.
Figure 4B:
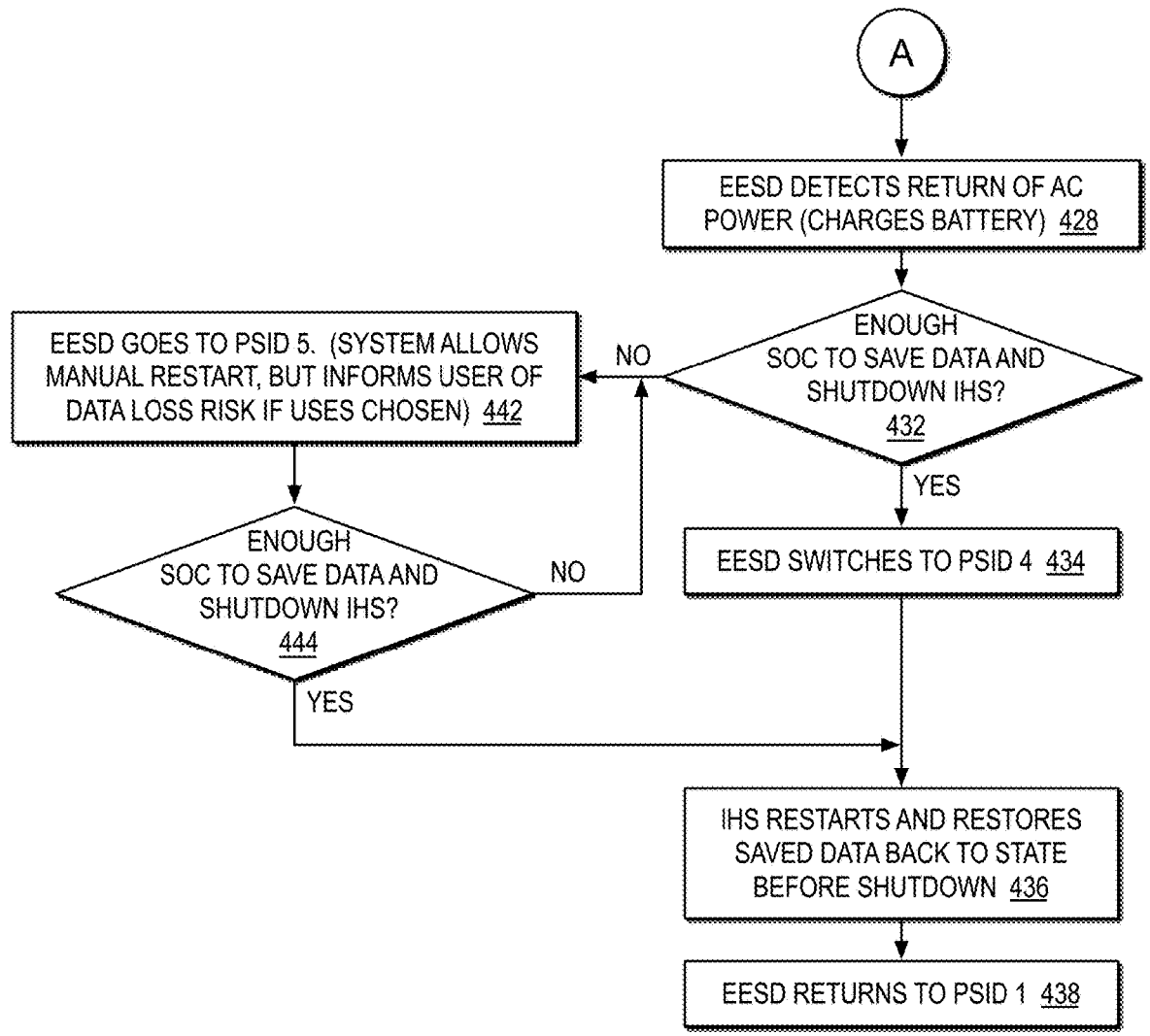

FIG. 4 is a flowchart illustrating operation of the system 100 of FIG. 1 according to one embodiment of the disclosed systems and methods. The operation may be implemented according to FIG. 4 such that the external energy storage device 104 actively makes decisions regarding the actions the information handling system 102 should take and sends power state information (e.g., PSID or VDM) to the information handling system 102 as a signal to command the information handling system 102 which performs the actions. This is in contrast to the implementation of FIG. 6 in which the external energy storage device 104 passively provides the power state information to the information handling system 102 and the information handling system 102 makes the decisions regarding which actions to take based on the information provided by the external energy storage device 104. Flow begins at block 402.

At block 402, the power adapter 106 receives AC power and provides DC power to the external energy storage device 104, the external energy storage device 104 provides a PSID 1 to the information handling system 102, and the information handling system 102 runs normally. As described above, the external energy storage device 104 may receive a PSID from the power adapter 106 and pass it through to the information handling system 102 as PSID 1. Flow proceeds to block 404.

At block 404, the power adapter 106 loses AC power and ceases to provide power to the external energy storage device 104. Flow proceeds to block 406.

At block 406, the external energy storage device 104 detects the loss of power and changes to PSID 2. Flow proceeds to block 408.

At block 408, the information handling system 102, e.g., the embedded controller 212, detects the PSID 2 and notifies system firmware 218 which notifies the user of the AC power loss.

At decision block 412, the external energy storage device 104 determines whether AC power returned. In one embodiment, the external energy storage device 104 may wait a predetermined time for AC power to return since many power losses last only a few seconds. If AC power returns, flow proceeds to block 414; otherwise, flow proceeds to decision block 416.

At block 414, the external energy storage device 104 changes to PSID 1 in response to detecting the return of AC power. Flow effectively returns to block 402 (until another AC power loss, e.g., at block 404).

At decision block 416, the external energy storage device 104 determines whether the energy storage element 204 has enough charge (i.e., high enough SOC) to power the information handling system 102 for it to continue running. As described above, the external energy storage device 104 may make this determination based on current power usage by the information handling system 102, historical data of the power usage by the information handling system 102, or information received from the information handling system 102 previously or based on a statistical analysis of a sample of graceful system shutdowns. If the energy storage element 204 SOC is sufficiently large, flow proceed to block 418; otherwise, flow proceeds to block 422.

At block 418, the external energy storage device 104 continues to provide power to the information handling system 102 and monitor the SOC of the energy storage element 204. Flow returns to decision block 416.

At block 422, the external energy storage device 104 changes to PSID 3 to initiate a graceful/smart shutdown of the information handling system 102. Flow proceeds to block 424.

At block 424, the information handling system 102 performs a graceful shutdown. Flow proceeds to block 428.

At block 428, the external energy storage device 104 detects the return of AC power, i.e., detects that the power adapter 106 is providing power to the external energy storage device 104 such that the energy storage element 204 is being charged. Flow proceeds to decision block 432.

At decision block 432, the external energy storage device 104 determines whether there is enough SOC on the energy storage element 204 for the information handling system 102 to restart and to, if necessary, perform a graceful shutdown, as discussed above. If so, flow proceeds to block 434; otherwise, flow proceeds to block 442.

At block 434, the external energy storage device 104 changes to PSID 4. Flow proceeds to block 436.

At block 436, the information handling system 102, in response to the PSID 4, automatically restarts and restores from its saved state and resumes execution at the state it was in when it started its graceful shutdown, e.g., at block 422. Flow proceeds to block 438.

At block 438, the external energy storage device 104 changes to PSID 1 to indicate AC power is present. Flow ends at block 438 (until another AC power loss, e.g., at block 404).

At block 442, the external energy storage device 104 changes to PSID 5. As described above, in response to the change to PSID 5, the information handling system 102 may respond to a user pushing a power button/switch, e.g., on the information handling system 102. In one embodiment, if the user presses the power button, the system firmware 218 notifies the user of the risk of loss of data due to the low SOC of the energy storage element 204 and prompts the user to make a choice whether to continue restarting the system 102. If the user confirms, the system firmware 218 goes ahead and restarts the system and restores the saved data, e.g., as described with respect to block 436. Flow proceeds to decision block 444.

At decision block 444, the external energy storage device 104 determines whether there is enough SOC on the energy storage element 204 for the information handling system 102 to restart and to, if necessary, perform a graceful shutdown, as discussed above. If so, flow proceeds to block 438; otherwise, flow returns to block 442.

Figure 5:
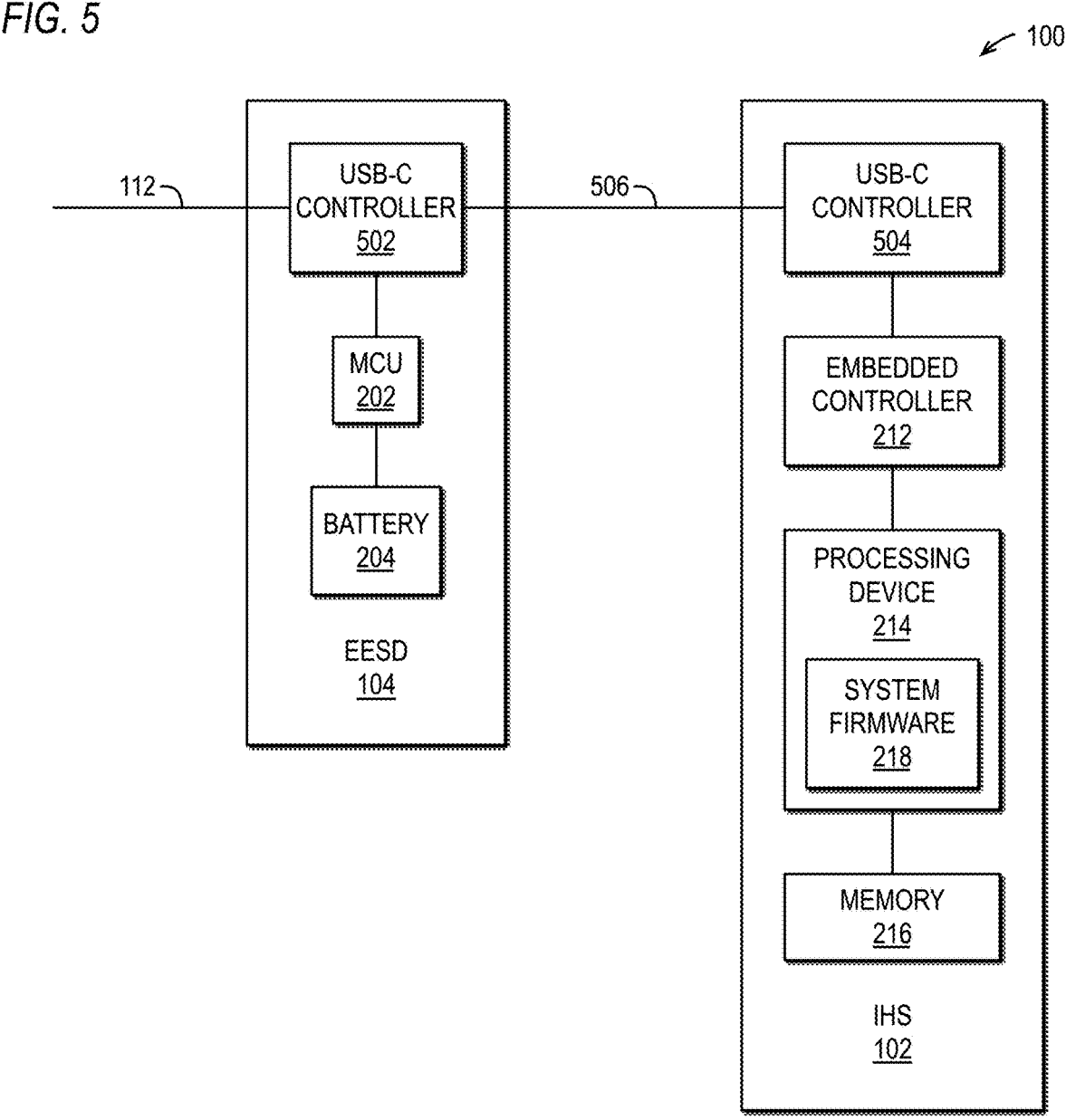
FIG. 5 illustrates a block diagram illustrating in more detail elements of the system of FIG. 1 according to one exemplary embodiment of the disclosed systems and methods.

FIG. 5 is a block diagram illustrating in more detail elements of system 100 of FIG. 1 as it may be configured according to an alternate embodiment of the disclosed systems and methods. The system 100 of FIG. 5 is similar in many respects to the system 100 of FIG. 2 and like-numbered elements are similar. Differences will now be described. In the embodiment of FIG. 5, the external energy storage device 104 includes a USB controller 502 coupled to the MCU 202, and the information handling system 102 includes a USB controller 504 coupled to the embedded controller 212, and the external energy storage device 104 and information handling system 102 of FIG. 5 are coupled by a USB cable 506 via the USB controllers 502 and 504. The USB cable 506 provides power to the information handling system 102 from the energy storage element 204 (or directly from the power adapter 106) via one or more power conductors. Additionally, the MCU 202 provides power state information to the embedded controller 212 over the USB cable 506 through the USB controllers 502/504. The power state information may be included in USB vendor-defined messages (VDM). In one embodiment, the USB cable 506 and USB controllers 502/504 conform substantially to the USB-C standard. In one embodiment, the VDM provided by the external energy storage device 104 to the information handling system 102 may carry a payload that includes a PSID value that corresponds substantially to the PSID values as described with respect to FIG. 3, and the system 100 of FIG. 5 may operate similarly to the operation described with respect to the flowchart of FIG. 4, except that the PSID values are transferred via VDM.

Multiple VDM may be stored in the external energy storage device 104, e.g., in a lookup table on MCU 202, based on the presence/absence of AC power on cable 112 from the power adapter 106 and/or based on the SOC of the energy storage element 204. As described above, the VDM may correspond substantially to the PSID as described above, e.g., with respect to FIG. 3. The MCU 202 may communicate different VDM to the embedded controller 212 over the USB cable 506. In response, the embedded controller 212 may communicate to the system firmware 218. The system firmware 218 may include a lookup table of VDM and corresponding actions. The system firmware 218 may look up the received VDM in the table and perform the corresponding action. The actions may include, for example, saving system data to non-volatile memory (e.g., hard drive or SSD) and shutting down the information handling system 102 in response to a loss of AC power to the power adapter 106, notifying a user that AC power has been lost, or restarting the information handling system 102 and restoring the saved system data to place the information handling system 102 back to the state it had before the graceful shutdown.

Figure 6A:
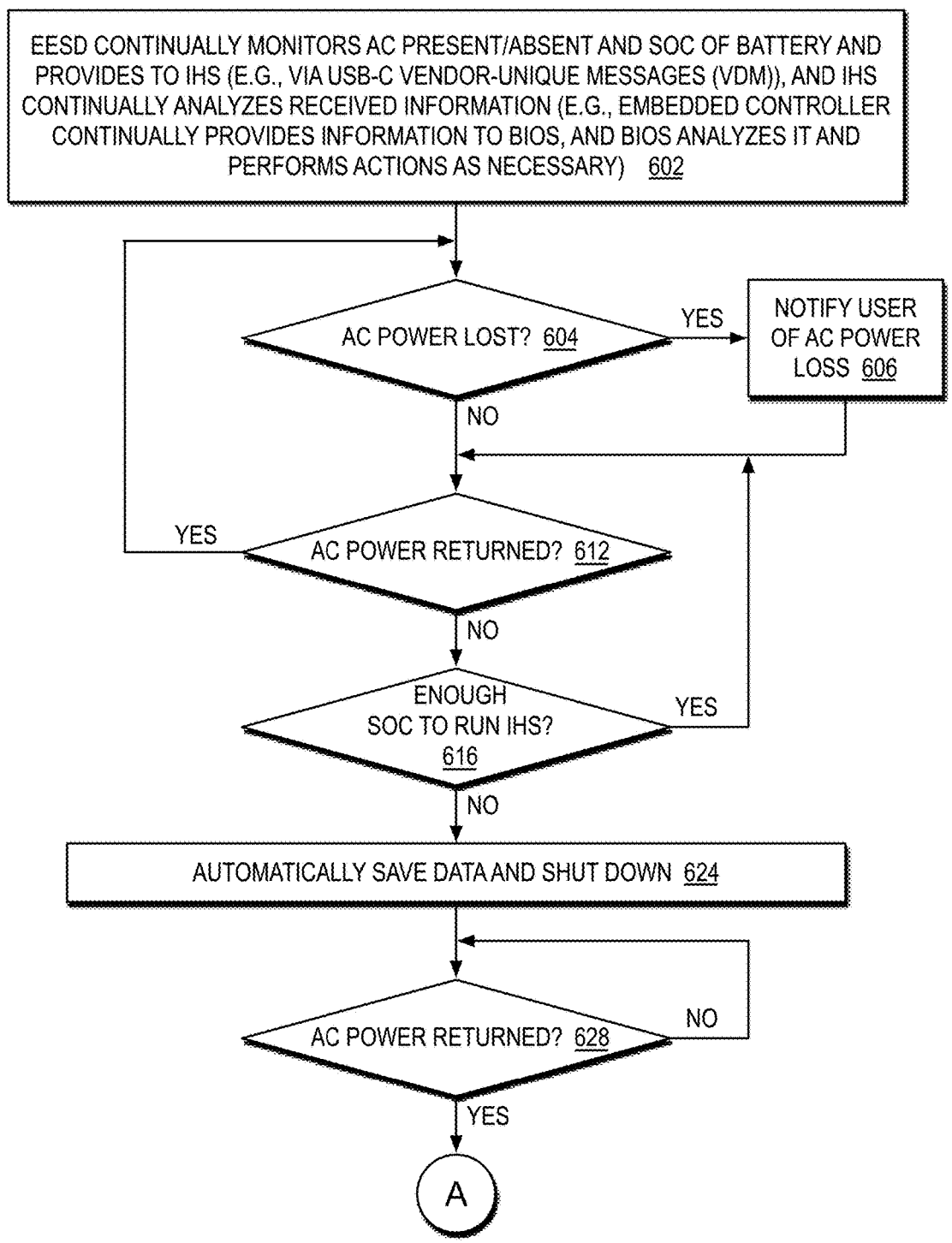
FIGS. 6A and 6B illustrate a flowchart illustrating operation of the system of FIG. 1 according to one exemplary embodiment of the disclosed systems and methods.
Figure 6B:
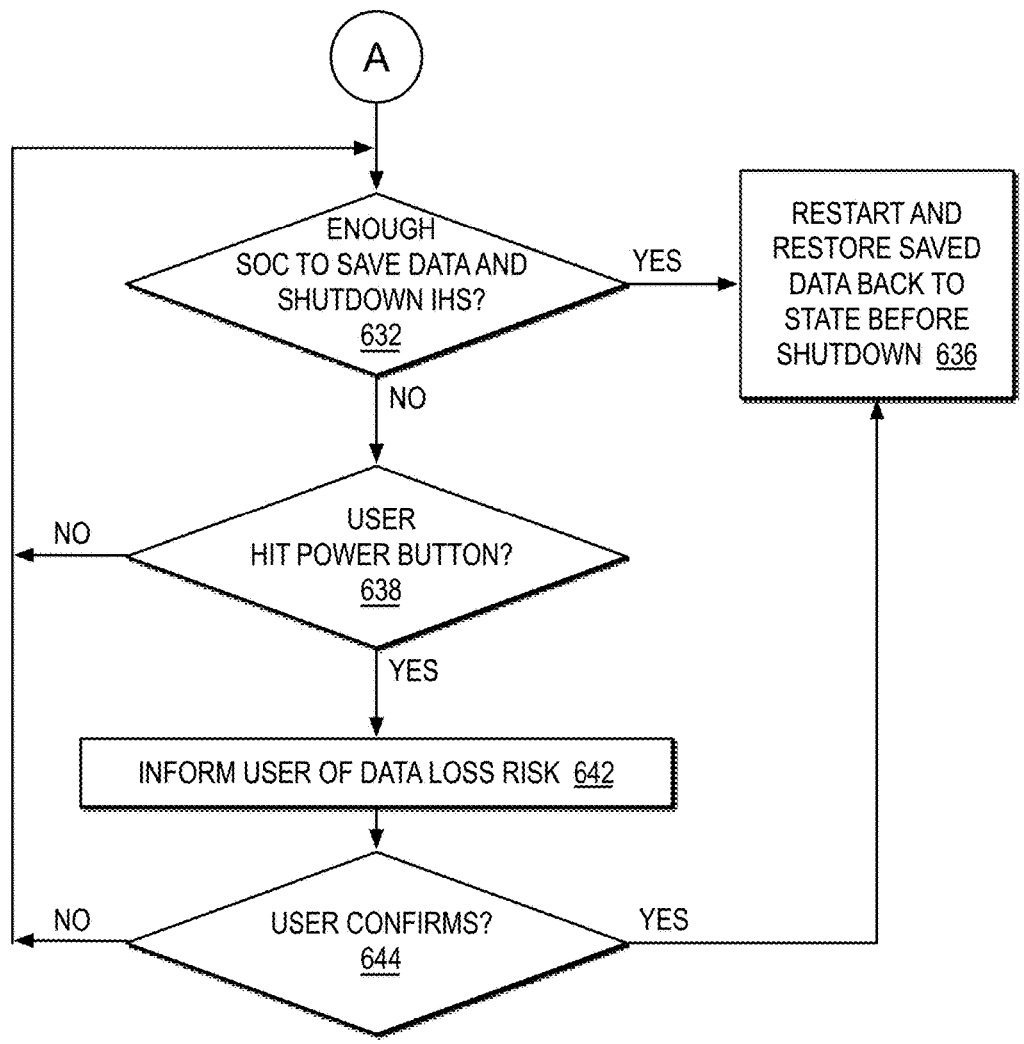

In an alternate embodiment, the MCU 202 periodically sends VDM to the information handling system 102 that includes raw power state data, e.g., indication of the presence/absence of AC power and the raw SOC of the energy storage element 204 (e.g., percentage charged), and the system firmware 218 or an application program running on the processing device 214 analyzes the raw data and makes determinations about when to gracefully shut down the information handling system 102, when to notify the user of AC power loss, when to automatically restart the information handling system 102, and when to allow/require the user to manually restart the information handling system 102, for example as described with respect to FIG. 6. In one embodiment, the use of USB-C VDM to convey power state information is described in detail in U.S. patent application Ser. No. 15/494,320 filed Apr. 21, 2017, which is incorporated herein by reference in its entirety for all purposes.

FIG. 6 is a flowchart illustrating operation of the system 100 of FIG. 1 according to an alternate embodiment of the disclosed systems and methods. Flow begins at block 602.

At block 602, the external energy storage device 104 continually monitors the presence/absence of AC power (e.g., by monitoring the presence/absence of input DC power via cable 112 from the power adapter 106) and monitors the SOC of the energy storage element 204, and provides the gathered information to the information handling system 102 over the cable 108. In one embodiment, the external energy storage device 104 provides the information via USB-C VDM. In another embodiment, the external energy storage device 104 provides the information via PSID value on the second conductor of the cable 108 of FIG. 1. Additionally, the information handling system 102 continually analyzes the information received from the external energy storage device 104. For example, the embedded controller 212 may continually provide the received information to the system firmware 218 which analyzes the information and performs actions as necessary, as described herein. That is, throughout the operation described in FIG. 6, the MCU 202 continually monitors the presence/absence of AC power and battery SOC, and the embedded controller 212/system firmware 218 continuously analyze the received SOC and AC power presence/absence information. In one embodiment, the external energy storage device 104 provides merely the SOC of the energy storage element 204, and the information handling system 102 infers the absence/presence of AC power from the SOC, e.g., if the SOC is decreasing, the information handling system 102 infers AC power is absent, and if the SOC is increasing or at its full value, the information handling system 102 infers AC power is present. Flow proceeds to decision block 604.

At decision block 604, the information handling system 102 determines from the continually received information whether AC power has been lost. If so, flow proceeds to block 606; otherwise, flow proceeds to decision block 612.

At block 606, the information handling system 102 notifies the user that AC power has been lost. Flow proceeds to decision block 612.

At decision block 612, the information handling system 102 determines whether AC power has returned. If so, flow returns to decision block 604; otherwise, flow proceeds to decision block 616.

At decision block 616, the information handling system 102 determines whether the energy storage element 204 has enough charge (i.e., high enough SOC) to power the information handling system 102 for it to continue running. The information handling system 102 may make this determination based on a statistical analysis of a sample of graceful system shutdowns, e.g., of a history of the system 100 itself. If the energy storage element 204 SOC is sufficiently large, flow proceed to decision block 612; otherwise, flow proceeds to block 624.

At block 624, the information handling system 102 performs a graceful shutdown. Flow proceeds to decision block 628.

At decision block 628, the information handling system 102 determines whether AC power has returned. If so, flow proceeds to decision block 632; otherwise, flow returns to decision block 628.

At decision block 632, the information handling system 102 determines whether there is enough SOC on the energy storage element 204 for the information handling system 102 to restart and to, if necessary, perform a graceful shutdown, as discussed above. If so, flow proceeds to block 636; otherwise, flow proceeds to decision block 638. It should be understood that in an embodiment in which the information handling system 102 includes an internal energy storage element (e.g., the embodiment of FIG. 7), the information handling system 102 takes into account not only the SOC of the energy storage element 204, but also the SOC of the internal battery when making its decisions at blocks that consider the SOC (e.g., blocks 616 and 632).

At block 636, the information handling system 102 automatically restarts and restores from its saved state and resumes execution at the state it was in when it started its graceful shutdown, e.g., at block 624.

At decision block 638, the information handling system 102 determines whether the user has hit the power button/switch. If so, flow proceeds to block 642; otherwise, flow returns to decision block 632.

At block 642, the information handling system 102 notifies the user of the risk of loss of data due to the low SOC of the energy storage element 204 and prompts the user to make a choice whether to continue restarting the system 102. Flow proceeds to decision block 644.

At decision block 644, the information handling system 102 determines whether the user confirmed the desire to restart the system. If the user confirms, flow proceeds to block 636 at which the information handling system 102 goes ahead and restarts the system and restores the saved data; otherwise, flow returns to decision block 632.

Figure 7:
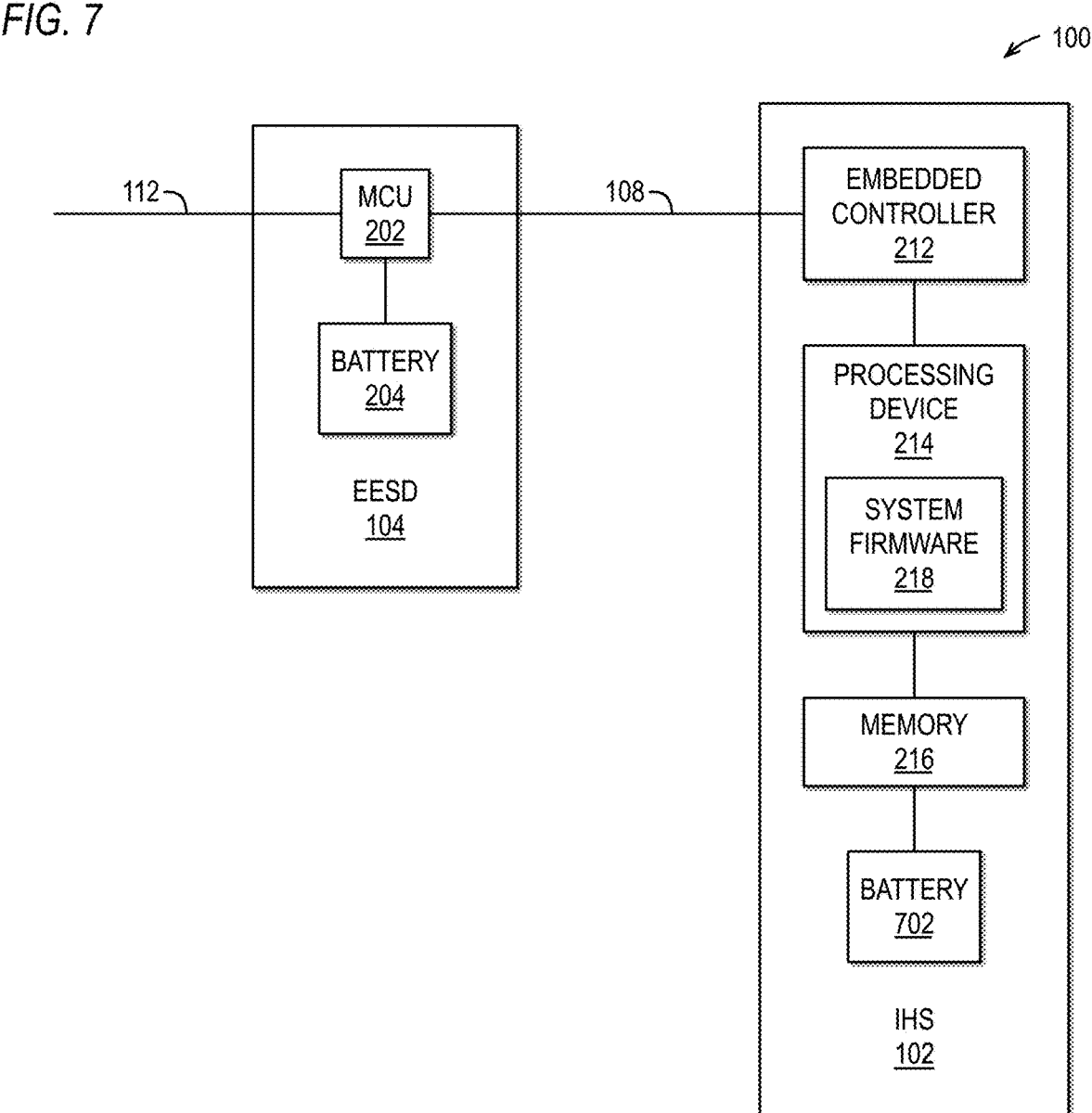
FIG. 7 illustrates a block diagram illustrating in more detail elements of the system of FIG. 1 according to one exemplary embodiment of the disclosed systems and methods.

FIG. 7 is a block diagram illustrating in more detail elements of system 100 of FIG. 1 as it may be configured according to an alternate embodiment of the disclosed systems and methods. The system 100 of FIG. 7 is similar in many respects to the system 100 of FIG. 2 and like-numbered elements are similar. Differences will now be described. In the embodiment of FIG. 7, the information handling system 102, rather than being a fixed compute system, includes its own internal energy storage element 702, e.g., mobile device with battery, yet still advantageously receives PSID power state information from the external energy storage device 104, similar to the manner described above. In this manner, the mobile information handling system 102 of FIG. 7 may enjoy the benefits of an additional external energy storage device 104, e.g., additional battery life, and also receive the PSID from the external energy storage device 104 to continue to be able to detect a loss of AC power, for example. The mobile information handling system 102 may also include software (e.g., enhanced operating system and/or application program) that receives the SOC of the energy storage element 204 via the PSID and displays the energy storage element 204 SOC level in a second icon in addition to the battery level of the internal battery of the mobile device, for example. Embodiments describing a mobile information handling system 102 configured to receive information from a EESD (e.g., EESD 104) via USB-C VDM and to display information (e.g., battery level) for a second, external battery are described in previously incorporated U.S. patent application Ser. No. 15/494,320 filed Apr. 21, 2017, e.g., with respect to FIGS. 4 and 5. Advantageously, alternate embodiments of FIG. 7 may perform a similar function but in which a PSID is provided over a single conductor of the cable 108 rather than a VDM.

Figure 8:
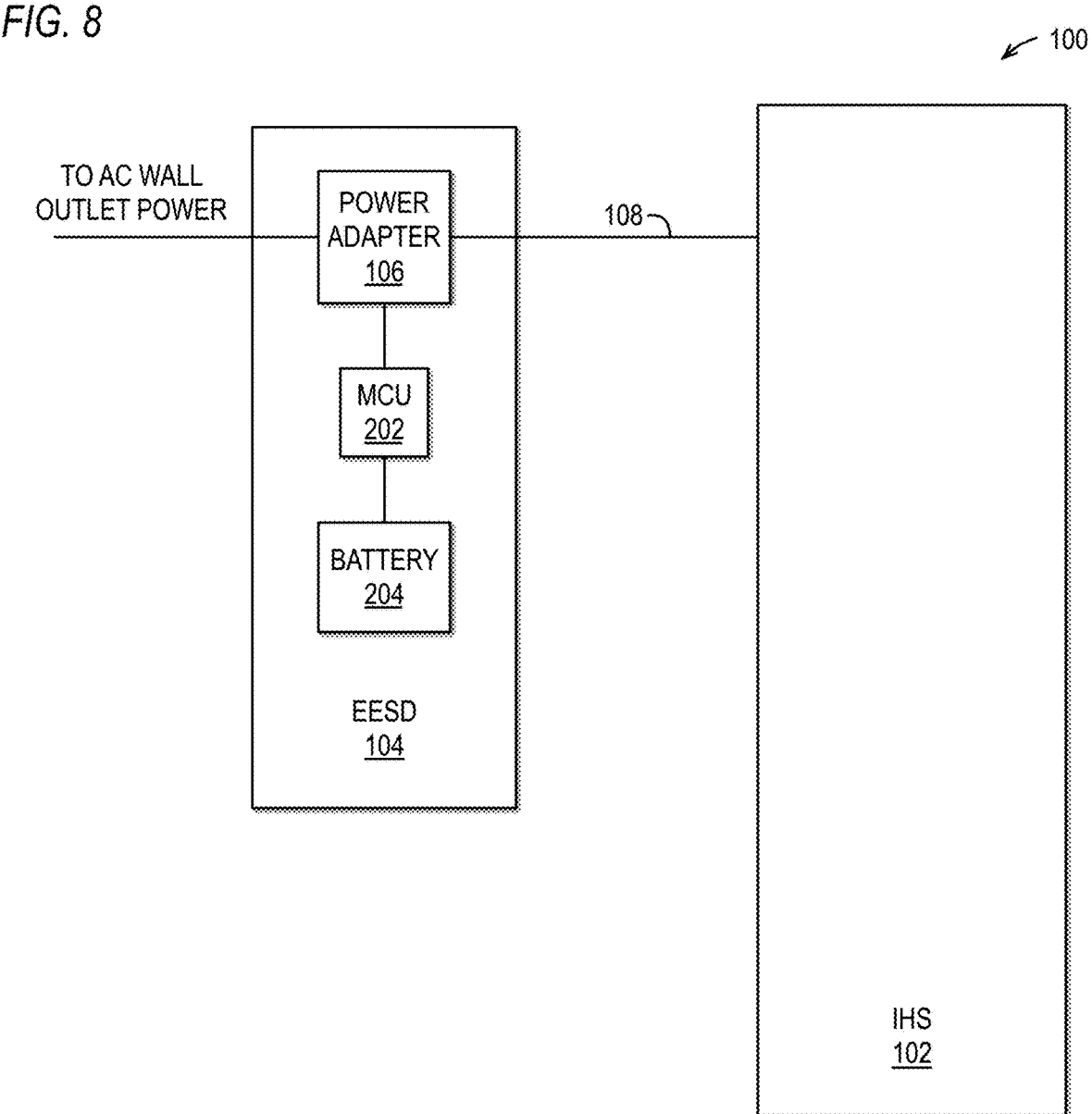
FIG. 8 illustrates a block diagram illustrating in more detail elements of the system of FIG. 1 according to one exemplary embodiment of the disclosed systems and methods.

FIG. 8 is a block diagram illustrating in more detail elements of system 100 of FIG. 1 as it may be configured according to an alternate embodiment of the disclosed systems and methods. The system 100 of FIG. 8 is similar in many respects to the system 100 of FIGS. 2, 5 and/or 7, and like-numbered elements are similar. The information handling system 102 may be configured according to any of the embodiments of FIGS. 2, 5 and/or 7. Differences will now be described. In the embodiment of FIG. 8, the power adapter 106 is combined within the external energy storage device 104 into a single form-factor. Advantageously, the combined power adapter/external energy storage device 104 may enjoy similar benefits to a discrete power adapter 106 and external energy storage device 104 implementation by providing power state information to the information handling system. As described herein, aspects of providing the power state information from the external energy storage device 104 to the information handling system 102 may include passively providing information regarding the current SOC of the energy storage element 204 and/or the current status of absence/presence of AC wall power (e.g., as a provided value of SOC of the energy storage element 204 and/or a provided status of absence or presence of AC wall power provided to the AC-DC adapter) so as to allow the information handling system 102 to decide which power management actions to take based on this provided passive power state information, or may include actively analyzing the SOC and/or absence/presence to make decisions to provide the power state information as command signals from the external energy storage device 104 to the information handling system 102 to command the information handling system 102 to take one or more actions. Furthermore, aspects of providing the power state information may include providing the information on a single conductor in an analog or digital fashion, or by transmitting USB-C VDMs.

As described herein, aspects of providing the power state information from the external energy storage device 104 to the information handling system 102 may include passively providing information regarding the current SOC of the energy storage element 204 and/or the current status of absence/presence of AC wall power (e.g., as a provided value of SOC of the energy storage element 204 and/or a provided status of absence or presence of AC wall power provided to the AC-DC adapter) so as to allow the information handling system 102 to decide which power management actions to take based on this provided passive power state information, or may include actively analyzing the SOC and/or absence/presence to make decisions to provide the power state information as command signals from the external energy storage device 104 to the information handling system 102 to command the information handling system 102 to take one or more actions. Furthermore, aspects of providing the power state information may include providing the information on a single conductor in an analog (e.g., PSID) or digital fashion, or by transmitting USB-C VDMs.

It will be understood that the steps of FIGS. 4A/B and 6A/B are exemplary only, and that any combination of fewer, additional and/or alternative steps may be employed that are suitable for managing an information handling system, e.g., a fixed compute system, that receives power from a EESD operating essentially as a UPS.

It will be understood that one or more of the tasks, functions, or methodologies described herein (e.g., including those described herein for components 202, 212, 214, 502, 504, etc.) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program comprising instructions is configured when executed on a processing device in the form of a programmable integrated circuit (e.g., processor such as CPU, controller, microcontroller, microprocessor, ASIC, etc. or programmable logic device "PLD" such as FPGA, complex programmable logic device "CPLD", etc.) to perform one or more steps of the methodologies disclosed herein. In one embodiment, a group of such processing devices may be selected from the group consisting of CPU, controller, microcontroller, microprocessor, FPGA, CPLD and ASIC. The computer program of instructions may include an ordered listing of executable instructions for implementing logical functions in an information handling system or component thereof. The executable instructions may include a plurality of code segments operable to instruct components of an information handling system to perform the methodologies disclosed herein.

It will also be understood that one or more steps of the present methodologies may be employed in one or more code segments of the computer program. For example, a code segment executed by the information handling system may include one or more steps of the disclosed methodologies. It will be understood that a processing device may be configured to execute or otherwise be programmed with software, firmware, logic, and/or other program instructions stored in one or more non-transitory tangible computer-readable mediums (e.g., data storage devices, flash memories, random update memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed methods and systems may be utilized in various combinations and/or independently. Thus the invention is not limited to only those combinations shown herein, but rather may include other combinations.

What is claimed is:

1. An information handling system, comprising:
a memory configured to store an operating system;
a processing device configured to execute the operating system;
where the information handling system is configured to receive, over one or more conductors of a cable, direct current (DC) power from an energy storage element of an external energy storage device including a microcontroller and having a single form-factor that is discrete and separate from a form-factor of the information handling system, and
the external energy storage device including the microcontroller integrated with the energy storage element within the single form factor of the external energy storage device with the external energy storage device being coupled between an AC to DC power adapter and the information handling system;
where the information handling system is further configured to receive from the microcontroller of the external energy storage device, over one or more conductors of the cable, power state information comprising information based on a state of charge (SOC) of the energy storage element of the external energy storage device and/or the presence/absence of AC wall outlet power provided to the AC to DC power adapter;

where the information handling system is configured without an internal energy storage element to provide power to the memory and processing device to execute the operating system;

where the information handling system is configured to receive the DC power from the external energy storage device on at least a first conductor of the cable and to receive the power state information on at least a second conductor of the cable;

where the information handling system is further configured to receive over the cable from the microcontroller of the external energy storage device a first predetermined value of the power state information when the microcontroller detects the power adapter has stopped providing power to the external energy storage device;

where the information handling system is further configured to, after receiving the first predetermined value, receive over the cable from the microcontroller of the external energy storage device a second predetermined value of the power state information when the microcontroller detects the SOC of the energy storage element has dropped to a predetermined level;

where the information handling system is further configured to, after receiving the second predetermined value, receive over the cable from the microcontroller of the external energy storage device a third predetermined value of the power state information when the microcontroller detects the power adapter has resumed providing power to the external energy storage device and the SOC of the energy storage element is above the predetermined level;

where the information handling system is further configured to, after receiving the second predetermined value, receive over the cable from the microcontroller of the external energy storage device a fourth predetermined value of the power state information when the microcontroller detects the power adapter has resumed providing power to the external energy storage device and the SOC of the energy storage element is below the predetermined level; and where the information handling system is configured to perform one or more actions in response to the received power state information.

2. The information handling system of claim 1, where the operating system is configured without power management profiles used to manage rechargeable energy storage devices that would provide power to the information handling system.

3. The information handling system of claim 1, where the one or more actions are selected from the following list:
 initiating an automatic shutdown of the information handling system;
 restarting the information handling system and restore system data saved during the automatic shutdown;
 notifying a user of the information handling system regarding a detected absence of the AC wall outlet power;
 causing the processing device to lower its executing power saving state (P-state); and
 displaying to the user the SOC of the external energy storage device received from the external energy storage device.

4. The information handling system of claim 1, where distinct analog current values on the second conductor correspond to distinct values of the power state information.

5. The information handling system of claim 4, where the power state information is received by the information handling system as analog power supply identifier (PSID) values.

6. The information handling system of claim 1, where the cable comprises a universal serial bus (USB) cable; and where the power state information is received by the information handling system in USB vendor-defined messages from the external energy storage device.

7. The information handling system of claim 1, where the power state information is received by the information handling system from the external energy storage device as a command signal specifying the one or more actions; and where the information handling system is configured to perform the one or more actions according to the command signal.

8. A method, comprising:

receiving, by an information handling system, over one or more conductors of a cable, direct current (DC) power from an energy storage element of an external energy storage device that includes a microcontroller and having a single form-factor that is discrete and separate from a form-factor of the information handling system, with the external energy storage device including the microcontroller integrated with the energy storage element within a single form factor of the energy storage device with the external energy storage device being coupled between an AC to DC power adapter and the information handling system;

receiving, by the information handling system from the microcontroller of the external energy storage device, over one or more conductors of the cable, power state information comprising information based on a state of charge (SOC) of the energy storage element of the external energy storage device and/or the presence/absence of AC wall outlet power provided to the AC to DC power adapter; and performing, by the information handling system, one or more actions in response to the received power state information;

where the information handling system is configured without an internal energy storage element to provide power to a memory and a processing device of the information handling system to execute an operating system;

where the information handling system is configured to receive the DC power from the external energy storage device on at least a first conductor of the cable and to receive the power state information on at least a second conductor of the cable;

where the information handling system is further configured to receive over the cable from the microcontroller of the external energy storage device a first predetermined value of the power state information when the microcontroller detects the power adapter has stopped providing power to the external energy storage device;

where the information handling system is further configured to, after receiving the first predetermined value, receive over the cable from the microcontroller of the external energy storage device a second predetermined value of the power state information when the microcontroller detects the SOC of the energy storage element has dropped to a predetermined level;

where the information handling system is further configured to, after receiving the second predetermined value, receive over the cable from the microcontroller of the external energy storage device a third predetermined value of the power state information when the microcontroller detects the power adapter has resumed providing power to the external energy storage device and the SOC of the energy storage element is above the predetermined level; and where the information handling system is further configured to, after receiving the second predetermined value, receive over the cable from the microcontroller of the external energy storage device a fourth predetermined value of the power state information when the microcontroller detects the power adapter has resumed providing power to the external energy storage device and the SOC of the energy storage element is below the predetermined level.

9. The method of claim 8,
where the operating system is configured without power management profiles used to manage rechargeable energy storage devices that would provide power to the information handling system.

10. The method of claim 8,
where the one or more actions are selected from the following list:
  initiating an automatic shutdown of the information handling system;
  restarting the information handling system and restore system data saved during the automatic shutdown;
  notifying a user of the information handling system regarding a detected absence of the AC wall outlet power;
  causing the processing device to lower its executing power saving state (P-state); and
  displaying to the user the SOC of the external energy storage device received from the external energy storage device.

11. The method of claim 8,
where distinct current values on the second conductor correspond to distinct values of the power state information.

12. The method of claim 8,
where the power state information is received by the information handling system as analog power supply identifier (PSID) values.

13. The method of claim 8,
where the cable comprises a universal serial bus (USB) cable; and
where the power state information is received by the information handling system in USB vendor-defined messages from the external energy storage device.

14. The method of claim 8,
where the power state information is received by the information handling system from the external energy storage device as a command signal specifying the one or more actions; and where the information handling system is configured to perform the one or more actions according to the command signal.

15. An apparatus comprising a microcontroller and having a single form-factor that is discrete and separate from a form-factor of an information handling system, the apparatus further comprising:
  an energy storage element having a state of charge (SOC), and
  the microcontroller integrated with the energy storage element within the single form factor of the energy storage device, and the apparatus having an input to receive power from an AC-to-DC power adapter for charging the energy storage element and for providing power to the information handling system on a cable coupling the apparatus and the information handling system;

where the microcontroller is programmed to provide power state information to the information handling system over the cable;

where the power state information is based on the SOC of the energy storage element and/or a presence/absence of AC power to the AC to DC power adapter;

where the power state information comprises at least one of:
  a command signal to cause the information handling system to perform one or more actions, or
  analog current values corresponding to distinct values of the power state information;

where the microcontroller is programmed to provide a first predetermined value of the power state information over the cable to the information handling system when the microcontroller detects the power adapter has stopped providing power to the apparatus;

where the microcontroller is programmed to, after providing the first predetermined value, provide a second predetermined value of the power state information over the cable to the information handling system when the microcontroller detects the SOC of the energy storage element has dropped to a predetermined level;

where the microcontroller is programmed to, after providing the second predetermined value, provide a third predetermined value of the power state information over the cable to the information handling system when the microcontroller detects the power adapter has resumed providing power to the apparatus and the SOC of the energy storage element is above the predetermined level; and where the microcontroller is programmed to, after providing the second predetermined value, provide a fourth predetermined value of the power state information over the cable to the information handling system when the microcontroller detects the power adapter has resumed providing power to the apparatus and the SOC of the energy storage element is below the predetermined level.

16. The apparatus of claim 15,
where the power state information specifies the SOC of the energy storage element and/or the presence/absence of AC power to the AC to DC power adapter.

17. The apparatus of claim 15,
where the microcontroller is further programmed to pass through on the cable to the information handling system one or more power supply identifier (PSID) values generated by the AC to DC power adapter that identify one or more characteristics of the AC to DC power adapter while the AC to DC power adapter is providing power to the apparatus; and
where the PSID values generated by the AC to DC power adapter are separate and different from the power state information provided by the microcontroller.

18. The apparatus of claim 15,
where an output of the apparatus comprises a first conductor coupled to ground, a second conductor over which the power from the energy storage element is provided to the information handling system, and a third conductor on which distinct values of the power state information are provided as distinct analog current values.

19. The apparatus of claim 15,
where the cable comprises a universal serial bus (USB) cable; and
where the microcontroller is programmed to provide the power state information to the information handling system on the output over the USB cable in USB vendor-defined messages.

20. An apparatus, comprising:
an energy storage element having a state of charge (SOC), and at least one of:
    an AC to DC power adapter integrated with the energy storage element within a single form factor of the apparatus and having an input to receive AC wall outlet power provided to the AC to DC power adapter for charging the energy storage element and for providing power to an information handling system on a cable coupling the apparatus and the information handling system, or
    an input to receive power from an AC-to-DC power adapter for charging the energy storage element and for providing power to the information handling system on the cable coupling the apparatus and the information handling system;
a microcontroller programmed to provide power state information to the information handling system over the cable; and
where the power state information is based on the SOC of the energy storage element and/or a presence/absence of AC power to the power adapter;
where the power state information comprises at least one of:
    a command signal to cause the information handling system to perform one or more actions, or
    analog current values corresponding to distinct values of the power state information;
where the microcontroller is programmed to provide a first predetermined value of the power state information over the cable to the information handling system when the microcontroller detects the power adapter has stopped providing power to the apparatus;
where the microcontroller is programmed to, after providing the first predetermined value, provide a second predetermined value of the power state information over the cable to the information handling system when the microcontroller detects the SOC of the energy storage element has dropped to a predetermined level;
where the microcontroller is programmed to, after providing the second predetermined value, provide a third predetermined value of the power state information over the cable to the information handling system when the microcontroller detects the power adapter has resumed providing power to the apparatus and the SOC of the energy storage element is above the predetermined level; and
where the microcontroller is programmed to, after providing the second predetermined value, provide a fourth predetermined value of the power state information over the cable to the information handling system when the microcontroller detects the power adapter has resumed providing power to the apparatus and the SOC of the energy storage element is below the predetermined level.

21. An information handling system, comprising:
a memory configured to store an operating system; and
    a processing device configured to execute the operating system;
    where at least one processing device of the information handling system is configured to receive, over one or more conductors of a cable, direct current (DC) power from an energy storage element of an external energy storage device, the external energy storage device being coupled between an AC to DC power adapter and the information handling system;
    where at least one processing device of the information handling system is further configured to receive, over one or more conductors of the cable, power state information comprising information based on a state of charge (SOC) of the energy storage element of the external energy storage device and/or the presence/absence of AC wall outlet power provided to the AC to DC power adapter;
    where the information handling system is configured without an internal energy storage element to provide power to the memory and processing device to execute the operating system;
    where the information handling system is configured to receive the DC power from the external energy storage device on at least a first conductor of the cable and to receive the power state information on at least a second conductor of the cable;
    where the information handling system is further configured to receive over the cable from the external energy storage device a first predetermined value of the power state information when the power adapter has stopped providing power to the external energy storage device;
    where the information handling system is further configured to, after receiving the first predetermined value, receive over the cable from the external energy storage device a second predetermined value of the power state information when the SOC of the energy storage element has dropped to a predetermined level;
    where the information handling system is further configured to, after receiving the second predetermined value, receive over the cable from the external energy storage device a third predetermined value of the power state information when the power adapter has resumed providing power to the external energy storage device and the SOC of the energy storage element is above the predetermined level;
    where the information handling system is further configured to, after receiving the second predetermined value, receive over the cable from the external energy storage device a fourth predetermined value of the power state information when the power adapter has resumed providing power to the external energy storage device and the SOC of the energy storage element is below the predetermined level; and
    where the information handling system is configured to perform one or more actions in response to the received power state information.

22. A method, comprising:
receiving, by an information handling system, over one or more conductors of a cable, direct current (DC) power from an energy storage element of an external energy storage device, the external energy storage device being coupled between an AC to DC power adapter and the information handling system;

receiving, by the information handling system, over one or more conductors of the cable, power state information comprising information based on a state of charge (SOC) of the energy storage element of the external energy storage device and/or the presence/absence of AC wall outlet power provided to the AC to DC power adapter; and performing, by the information handling system, one or more actions in response to the received power state information;

where the information handling system is configured without an internal energy storage element to provide power to a memory and a processing device of the information handling system to execute an operating system;

where the information handling system is configured to receive the DC power from the external energy storage device on at least a first conductor of the cable and to receive the power state information on at least a second conductor of the cable;

where the information handling system is further configured to receive over the cable from the external energy storage device a first predetermined value of the power state information when the power adapter has stopped providing power to the external energy storage device;

where the information handling system is further configured to, after receiving the first predetermined value, receive over the cable from the external energy storage device a second predetermined value of the power state information when the SOC of the energy storage element has dropped to a predetermined level;

where the information handling system is further configured to, after receiving the second predetermined value, receive over the cable from the external energy storage device a third predetermined value of the power state information when the power adapter has resumed providing power to the external energy storage device and the SOC of the energy storage element is above the predetermined level;

where the information handling system is further configured to, after receiving the second predetermined value, receive over the cable from the external energy storage device a fourth predetermined value of the power state information when the power adapter has resumed providing power to the external energy storage device and the SOC of the energy storage element is below the predetermined level.

23. An apparatus, comprising:

an energy storage element having a state of charge (SOC);

an AC to DC power adapter integrated with the energy storage element within a single form factor of the apparatus and having an input to receive AC wall outlet power provided to the AC to DC power adapter for charging the energy storage element and for providing power to an information handling system on a cable coupling the apparatus and the information handling system;

a microcontroller programmed to provide power state information to the information handling system over the cable; and where the power state information is based on the SOC of the energy storage element and/or a presence/absence of AC power to the power adapter;

where the power state information comprises at least one of:
a command signal to cause the information handling system to perform one or more actions, or
analog current values corresponding to distinct values of the power state information;

where the microcontroller is programmed to provide a first predetermined value of the power state information over the cable to the information handling system when the microcontroller detects the power adapter has stopped providing power to the apparatus;

where the microcontroller is programmed to, after providing the first predetermined value, provide a second predetermined value of the power state information over the cable to the information handling system when the microcontroller detects the SOC of the energy storage element has dropped to a predetermined level;

where the microcontroller is programmed to, after providing the second predetermined value, provide a third predetermined value of the power state information over the cable to the information handling system when the microcontroller detects the power adapter has resumed providing power to the apparatus and the SOC of the energy storage element is above the predetermined level; and where the microcontroller is programmed to, after providing the second predetermined value, provide a fourth predetermined value of the power state information over the cable to the information handling system when the microcontroller detects the power adapter has resumed providing power to the apparatus and the SOC of the energy storage element is below the predetermined level.

24. An information handling system, comprising:

a memory configured to store an operating system;

a processing device configured to execute the operating system;

where the information handling system is configured to receive, over one or more conductors of a cable, direct current (DC) power from an energy storage element of an external energy storage device including a microcontroller and having a single form-factor that is discrete and separate from a form-factor of the information handling system, and the external energy storage device including the microcontroller integrated with the energy storage element within the single form factor of the external energy storage device with the external energy storage device being coupled between an AC to DC power adapter and the information handling system;

where the information handling system is further configured to receive from the microcontroller of the external energy storage device, over one or more conductors of the cable, power state information comprising information based on a state of charge (SOC) of the energy storage element of the external energy storage device and/or the presence/absence of AC wall outlet power provided to the AC to DC power adapter, where the power state information received from the microcontroller of the external energy storage device comprises:

a first predetermined value of the power state information when the microcontroller detects the power adapter has stopped providing power to the external energy storage device, a second predetermined value of the power state information received after the first predetermined value when the microcontroller detects the SOC of the energy storage element has dropped to a predetermined level, a third predetermined value of the power state information received after the second predetermined value when the microcontroller detects the power adapter has resumed providing power to the external energy storage device and the SOC of the energy storage element is above the predetermined level, and a fourth predetermined value of the power state information received after the third predetermined value when the microcontroller detects the power adapter has resumed providing power to the external energy storage device and the SOC of the energy storage element is below the predetermined level; and;

where at least one of:
  the information handling system is configured without an internal energy storage element to provide power to the memory and processing device to execute the operating system, or
  the information handling system is configured to receive DC power from the external energy storage device on at least a first conductor of the cable and to receive the power state information on at least a second conductor of the cable; and where the information handling system is configured to perform one or more actions in response to the received power state information.

25. A method, comprising:

receiving, by an information handling system, over one or more conductors of a cable, direct current (DC) power from an energy storage element of an external energy storage device that includes a microcontroller and having a single form-factor that is discrete and separate from a form-factor of the information handling system, with the external energy storage device including the microcontroller integrated with the energy storage element within a single form factor of the energy storage device with the external energy storage device being coupled between an AC to DC power adapter and the information handling system;

receiving, by the information handling system from the microcontroller of the external energy storage device, over one or more conductors of the cable, power state information comprising information based on a state of charge (SOC) of the energy storage element of the external energy storage device and/or the presence/absence of AC wall outlet power provided to the AC to DC power adapter, where the power state information received from the microcontroller of the external energy storage device comprises:

a first predetermined value of the power state information when the microcontroller detects the power adapter has stopped providing power to the external energy storage device, a second predetermined value of the power state information received after the first predetermined value when the microcontroller detects the SOC of the energy storage element has dropped to a predetermined level, a third predetermined value of the power state information received after the second predetermined value when the microcontroller detects the power adapter has resumed providing power to the external energy storage device and the SOC of the energy storage element is above the predetermined level, and a fourth predetermined value of the power state information received after the third predetermined value when the microcontroller detects the power adapter has resumed providing power to the external energy storage device and the SOC of the energy storage element is below the predetermined level; and performing, by the information handling system, one or more actions in response to the received power state information;

where at least one of:
  the information handling system is configured without an internal energy storage element to provide power to a memory and a processing device of the information handling system to execute an operating system, or
  the information handling system is configured to receive DC power from the external energy storage device on at least a first conductor of the cable and to receive the power state information on at least a second conductor of the cable.

* * * * *